United States Patent [19]
Shipman

[11] Patent Number: 5,909,592
[45] Date of Patent: *Jun. 1, 1999

[54] METHOD IN A BASIC INPUT-OUTPUT SYSTEM (BIOS) OF DETECTING AND CONFIGURING INTEGRATED DEVICE ELECTRONICS (IDE) DEVICES

[75] Inventor: Mark S. Shipman, Portland, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,765

[22] Filed: Apr. 1, 1997

Related U.S. Application Data

[63] Continuation of application No. 08/301,593, Sep. 7, 1994, abandoned.

[51] Int. Cl.[6] ............................................. G06F 12/00
[52] U.S. Cl. ......................... 395/830; 395/829; 711/4; 711/112; 711/203
[58] Field of Search ................................... 395/828–831; 711/4, 100, 111, 112, 202, 203, 206, 209

[56] References Cited

U.S. PATENT DOCUMENTS

| | | | |
|---|---|---|---|
| 4,117,459 | 9/1978 | Douglas et al. | 395/185.08 |
| 4,589,063 | 5/1986 | Shah et al. | 395/828 |
| 4,773,036 | 9/1988 | Berens et al. | 395/439 |
| 4,775,931 | 10/1988 | Dickie et al. | 395/829 |
| 4,974,151 | 11/1990 | Advani et al. | 395/828 |
| 4,982,324 | 1/1991 | McConaughy et al. | 395/200.52 |
| 5,014,193 | 5/1991 | Garner et al. | 395/830 |
| 5,038,320 | 8/1991 | Heath et al. | 395/830 |
| 5,101,490 | 3/1992 | Getson, Jr. et al. | 395/835 |
| 5,167,021 | 11/1992 | Needham | 395/836 |
| 5,274,771 | 12/1993 | Hamilton et al. | 395/829 |
| 5,280,602 | 1/1994 | Holt | 395/404 |
| 5,299,322 | 3/1994 | Arai et al. | 395/829 |
| 5,327,549 | 7/1994 | Nissimov et al. | 395/439 |
| 5,345,561 | 9/1994 | Kato | 360/71 |
| 5,428,748 | 6/1995 | Davidson et al. | 395/829 |
| 5,440,693 | 8/1995 | Arnold et al. | 395/284 |
| 5,446,877 | 8/1995 | Liu et al. | 395/180 |
| 5,483,419 | 1/1996 | Kaczeus, Sr. et al. | 361/685 |
| 5,544,334 | 8/1996 | Noll | 395/309 |
| 5,675,761 | 10/1997 | Paul et al. | 395/404 |

*Primary Examiner*—Men-Ai T. An
*Assistant Examiner*—Sumati Lefkowitz
*Attorney, Agent, or Firm*—Blakely, Sokoloff, Taylor & Zafman LLP

[57] ABSTRACT

A method of recognizineg peripheral devices coupled to an interface such as an Integrated Device Electronics interface provides a logically sequential addressing scheme for peripheral devices that may not have physically contiguous or sequential addresses. The method enables operating systems that otherwise only support sequentially ordered drives to support access to devices coupled to the interface in any order. The method includes the step of copying a basic input/output (BIOS) device configuration table and a (BIOS) device parameter table into memory. The existence of any device coupled to the interface is tested using every physical device identifier supported by the size of the device configuration table. For each detected device 1) the configuration table is modified to indicate that the detected device is coupled to the interface, wherein the detected device is assigned a logical identifier sequential to that of any previously detected device; and 2) the device parameter table is modified to indicate parameters associated with the detected device. Thereafter, a specified device identifier is translated to a specified physical device identifier in response to an operating system request to access a selected device identified by the specified device identifier. The specified physical device identifier is then used to access a specified physical device in accordance with the configuration and device parameter tables.

22 Claims, 5 Drawing Sheets

METHOD IN A BASIC INPUT-OUTPUT SYSTEM (BIOS) OF DETECTING AND CONFIGURING INTEGRATED DEVICE ELECTRONICS (IDE) DEVICES

This is a continuation Ser. No. 08/301,593 filed Sep. 7, 1994, now abandoned.

BACKGROUND OF THE INVENTION

1. Field of the Invention

The present invention is related to personal computers and more particularly to a method in which integrated device electronics (IDE) devices are detected and configured by a basic input/output system (BIOS).

2. Background Art

In IBM compatible personal computers, data are stored on hard disk devices. A hard disk interface standard for Intel 80286, 80386 and 80486 computers called Enhanced Integrated Device Electronics (Enhanced IDE) was developed that provides high performance at low cost. The IDE standard provides that most of the controller electronics that were previously found on a controller card be located at the hard disk mechanism. Since the IDE interface can be placed on the mother board, because of its relatively simple electronics, a controller card is not needed, and hence an expansion slot is saved for other use.

When a user turns a computer power switch on, or presses a reset button, the computer "boots" itself, a term that is shorthand for pulling itself up by the bootstraps. Booting initiates an automatic start program routine that clears memory, executes diagnostics, loads a computer operating system software program into memory from disk storage and executes other routines that prepare the computer for use.

In IBM compatible personal computers the automatic start program includes a set of programs called basic input/output system (BIOS) that are encoded in read-only memory (ROM). The BIOS facilitates the transfer of data and instructions between a central processing unit (CPU) and peripheral devices such as disk drives. Computer systems are designed to perform functional tests of the BIOS every time the computer is turned on. This is called power on system test (POST).

During POST devices that are connected to the computer are detected and must be setup for operation. Prior BIOS device detection algorithms in setup require that a user enter the setup program and supply required information. The information is then stored in memory. This prior procedure requires a higher level of sophistication on the part of the user and costs more money because a larger memory is needed to store all of the information.

Competition between different brands of computers is vigorous, so a way of differentiating one brand from another can be a significant competitive advantage. Also, read only memory (ROM) by its very nature is expensive, so reducing the amount of code to be permanently stored in ROM can significantly reduce the overall cost of a computer.

It is desired that a user can set all Setup options to 'Auto' and have the BIOS do all detection and configuration of IDE devices during POST. This allows for a user to know little or nothing about how their computer operates to become productive using it.

It is desired that a mechanism be provided so that IDE devices do not have to be connected in any physical order to be recognized by BIOS and utilized by DOS, MICROSOFT WINDOWS, or any other Operating System.

It is therefore an object of the invention to provide a basic input/output system (BIOS) power on system test (POST) that does detection and configuration of IDE devices during POST.

SUMMARY OF THE INVENTION

Briefly, the above object is accomplished in accordance with the invention by providing physical to logical mapping of devices that are not mapped physically contiguously so they can be viewed logically contiguously. The invention uses a configuration table in BIOS to store mapping, feature support, and timing information about each device in the logical map.

In accordance with an aspect of the invention, detection and configuration of IDE devices is accomplished on-the-fly during POST, with required setup configuration information being obtained from a device and stored in a shadow memory portion of RAM.

An advantage of this invention is that it allows the use of multiple IDE connectors within a single system while providing transparent compatibility to DOS and MICROSOFT WINDOWS.

A further advantage of this invention is that a user can set all Setup options to 'Auto' and have the BIOS do all detection and configuration of IDE devices during POST.

A further advantage of the invention is that it provides a mechanism in which IDE devices do not have to be connected in physical order to be recognized by DOS and MICROSOFT WINDOWS.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
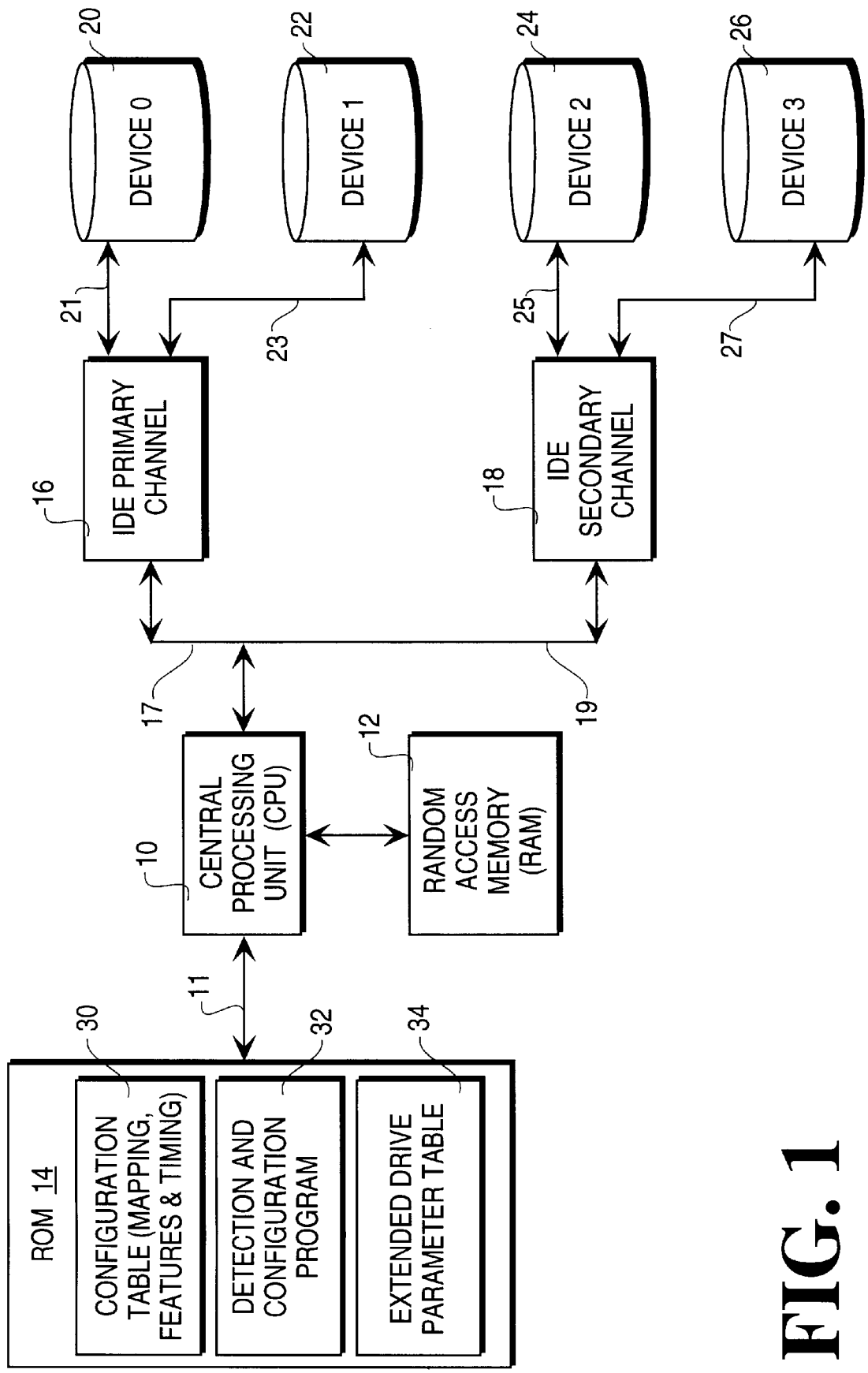
FIG. 1 is a block diagram of a computer system in which the present invention is embodied.

Refer to FIG. 1 which is a block diagram of a computer system in which the present invention is embodied. The computer system includes a central processing unit, CPU, (10), that is connected to a random access memory, RAM (12), a read only memory, ROM, (14), a primary channel (16) and a secondary channel (18). The channels control devices (20, 22, 24, 26) that read and write data recorded on magnetic disks.

For purposes of this diagram, only a Primary and Secondary channel are illustrated. It should be understood that this invention is extensible to any number of IDE channels.

When a user turns a power on/off switch on, or presses a reset button, the computer "boots" itself, a term that is shorthand for pulling itself up by the bootstraps. Booting initiates an automatic start program routine that is stored in read-only memory, ROM, (14). Unlike the RAM (12), the ROM (14) contents are not destroyed when power is turned off and cannot be modified. In IBM compatible personal computers the automatic start program includes a set of programs called basic input/output system (BIOS) that are encoded in ROM (14). The BIOS facilitates the transfer of data and instructions between the CPU (10) and devices. The BIOS clears memory, executes diagnostics and executes other routines that prepare the computer for use. The automatic start program instructs the CPU to read the first track of the hard or floppy disk (20). This loads a computer operating system software program into memory (12) from disk storage. The BIOS includes a power on system test (POST) software routine that performs tests of the computer's memory.

When the BIOS executes its Power On System Test it will copy the contents of itself into dynamic random-access memory (DRAM). This is a process known as shadowing the BIOS. After the contents of the ROM have been copied into Shadow RAM, they may be modified at the discretion of the BIOS. Information about the detected IDE devices will be stored in Shadow Memory.

The ROM (14) also holds an integrated device electronics (IDE) configuration table (30), a detection and configuration program (32), and an extended drive parameter table, EDPT, (34). There is one entry in the IDE configuration table (30) for each potential logical device connected to the IDE interfaces (21, 23, 25, 27).

The IDE configuration table contains all configuration information necessary to configure a device in conformance with an AT attachment committee (ATA-2) specification promulgated September 1993. The IDE configuration table is referenced during POST to determine all of the information that is needed to fill in the table, on the fly, without user interaction. Hence the user can plug any drive into the computer and the software will configure the system without user intervention. All of the features in the ATA specification may supported.

All of the hard drives are auto configurable, the user is not required to do anything. The user plugs in the drive and the BIOS responds appropriately to the drive. BIOS issues an identify drive command to the IDE device by writing an opcode for the command to an I/O port. The IDE device responds with data which the BIOS interprets to configure the drive. Not every drive vendor implements a response to this command in the same way. Also not every drive responds to a reset in the exact same way. The BIOS code of the present invention is such that regardless of how the drive is reset and regardless of how the drive responds to the identify drive command, the BIOS can auto configure the drive.

The configuration table (30) is stored in ROM (14) and is shadowed by transferring it to memory (12). Once the shadow copy of the configuration table is stored in memory (12) the BIOS is able to update the table and fill in all of the required information for a particular drive identified by a specific drive identifier (ID). The information comes from a number of sources, primarily the information comes back from the device in response to the identify drive command. A drive can be connected to different types of interface components that have different features supported. For example an interface component may interact with an ISA bus, a standard that has limited capabilities. Since a drive may support many features that the interface component does not, the code turns off the unsupported features. In another case, an interface component interacts with a PCI bus, a standard that supports I/O channel ready, 32 bit I/O transfers, and real fast Programmed I/O mode timing parameters. If a drive supports these features that the interface component supports, the code turns on the supported features. Thus the BIOS tunes the hardware for optimum performance.

Data Addressing Modes

For many years Operating Systems accessed fixed media disk drives by specifying the Cylinder, Head and Sector to retrieve the desired data from the disk. Because of this, the Int 13h Hard Disk Interface standardized around this type of protocol. When IDE drives were first introduced, this protocol was maintained. At its most primitive level, data on an IDE drive is accessed according to Logical Blocks instead of the traditional Cylinder-Head-Sector (CHS) method, even though the IDE Task File (the register level interface between the Drive and Host) is specified in the CHS format.

Combining the limitations of the Int 13h Application Programming Interface with those of the IDE Task File, only a maximum of 528 Mb of data can be accessed in a single IDE device. Because of advances in Hard Disk technology, drives of greater than 528 Mb are now becoming cost effective and new methods of Data Addressing are required. The Hard Disk Driver developed by Intel Corporation supports three standard Data Addressing Modes: cylinder-head-sector (CHS) mode, extended cylinder-head-sector (ECHS) mode, and logical block addressing (LBA) mode.

Cylinder-Head-Sector: The standard CHS mode is available for use on all drives and is compatible with all Operating Systems. In this mode up to a maximum of 16 heads, 1023 Cylinders and 63 Sectors may be specified. If a drive supports more than 1023 Cylinders, the amount usable is limited to 1023. Using this addressing mode up to 528 Mb of data is available. Since data is arranged on the disk using a linear addressing scheme rather than the CHS parameters, the drive firmware performs this translation.

Extended Cylinder-Head-Sector: The ECHS translation mode is used for drives that have capacities larger than 528 Mb but do not support the Logical Block Addressing mode (LBA). Though this translation method is not widely accepted in the industry it will work for most DOS and MICROSOFT WINDOWS applications. Using this translation method the number of Cylinders are reduced and the number of Heads are increased until the Cylinder count is below 1024. This method will not work effectively for drives much larger that 528M and if the two least significant bits of the cylinder number are not zero, then some drive capacity may be lost in the parameter translation. Sectors that are lost because of inefficiencies in the translation algorithm are called Orphan Sectors.

Logical Block Addressing: In LBA mode the location of data on the disk is specified using a 28-bit Logical Block Address. This 28-bit LBA corresponds exactly with the drives linear addressing scheme allowing the Host to bypass the drive firmware's translation code. This allows for faster disk accesses and up to 8.4 G of data is available. This method also allows the number of Orphan Sectors to be reduced to zero.

To be compatible with the existing Int 13h DOS interface the BIOS performs a translation to allow DOS and MICROSOFT WINDOWS to use the full 8.4 Gb available. This translation involves reducing the number of cylinders and increasing the number of head reported to DOS until the full capacity of the drive is specified. DOS uses these parameters when calling the Int 13h function and BIOS uses these parameters to calculate the LBA before accessing the device. The translation adds software overhead to the BIOS hard disk driver, but overall performance is still better than that of the CHS addressing mode.

Not all Operating Systems can use LBA. Some operating systems will automatically detect that LBA is being used while other operating systems will require that special options be set in their respective configuration files. Also, drives that have been partitioned and formatted using one addressing mode will need to be re-partitioned and re-formatted to use another. The different addressing schemes are not compatible with each other.

Data Transfer Modes:

Standard Programmed I/O Transfers: Programmed I/O (PIO) is the most fundamental transfer type supported by an IDE device. This type of transfer is supported by all IDE devices and provides the greatest compatibility across different devices, hardware, and Operating Systems. Using this mode, transfers are done on sector size (256 word) boundaries using 16 bit I/O. The host requires an interrupt from the IDE device after every sector transfer.

There are three standard PIO modes supported by the ATA-2 specification. Mode 0 is standard ISA (440 ns) cycle time and is supported by all IDE devices. Mode 1 is a slightly faster ISA (380 ns) cycle time, and Mode 2 is a fast ISA (240 ns) cycle time. Mode 1 and 2 may not be supported by all devices. The PIO timing mode is auto-configured by the BIOS.

Multiple Sector Transfers: Multiple Sector Transfers are identical to PIO transfers except that multiple sectors are transferred between interrupts to the host instead of just one. This improves performance dependent upon the number of sectors per block supported by the device and the type of buffer management applied.

Advanced PIO Timing Modes: PIO and Multiple Sector Transfers are considered to be 'blind'transfers because they depend upon the host interface component to satisfy all worst case conditions of attached devices data management algorithms. The ATA-2 specification defines an Advanced PIO timing mode (PIO Mode 3) that uses I/O Channel Ready (IORDY) and is based upon best case timing. Using PIO mode 3 the host assumes 180 ns cycle time (120 ns for I/O and 60 ns for DRAM access) unless acted upon by the IORDY signal.

32-Bit Data Transfers: When using one of the PIO timing modes the BIOS may elect to do 32 bit I/O if an interface component is detected that supports this type of I/O. 32 bit data transfers can provide as much as 20% improvement in performance over similar 16 bit data transfers.

DMA Transfers: Direct memory access (DMA) transfers are similar to Mode 3 PIO in the sense that the device controls the worst case timing instead of the host. Under this type of transfer, the host configures one of the DMA channels (Typically channel 7) to perform the transfer instead of the host CPU. Restrictions to this type of transfer are that the buffer provided must be word aligned and the transfer must not cross a 64K boundary. An additional restriction by the BIOS for compatibility is that when executing in Protected or Virtual Mode and Virtual DMA Services are not provide by the Operating System, the BIOS will abort the DMA transfer and use the next fastest transfer mode available.

Virtual DMA Services: The BIOS will use the Virtual DMA Services (VDS) provided by the Operating System when doing DMA transfers. This allows the BIOS to directly DMA into application buffers without having the Operating System trap DMA accesses. Because the BIOS supports this feature DMA transfers can be used in a DOS/MICROSOFT WINDOWS/Smardrive configuration without having to use double buffering for disk accesses.

Drive Configuration

Multi-Channel Support: The BIOS supports multiple IDE channels. The Task File for the compatible primary channel is located at addresses 1F0–1F7, 3F6–3F7 and uses IRQ 14. The Task File for the compatible secondary channel is located at addresses 170–177, 376–377 and uses IRQ 15. The BIOS will also support non-compatible channels that use non-standard Task File base addresses and non-standard IRQs. This provides for full support of native PCI IDE interface components. There may be up to two devices (Master and Slave) on each channel.

The BIOS allows configuration of a single device on each channel. In a typical operating environment, devices are addressed as 0/1 (Master/Slave in primary channel) and 2/3 (Master/Slave on secondary channel). (Typically an operating system would not support non-standard channels.) DOS and MICROSOFT WINDOWS address drives in sequential order requiring both the Master and Slave device to be present on the primary channel before allowing access to any devices on the secondary channel. The BIOS eliminates this restriction by presenting a logical device ID to DOS/MICROSOFT WINDOWS while accessing each device using its physical device ID. Under this scheme DOS may request data from device 1 while BIOS will actually address device 2. This scheme of physical to logical device ID translation allows for non-standard IDE channels to be utilized by DOS and MICROSOFT WINDOWS as well.

The main benefit of Multi-Channel Support is not the ability to connect multiple devices to the Host. In a particular configuration the one channel (17) may be connected to a local bus (i.e. PCI or VL) and another channel (19) may be connected to an EISA/ISA bus. Under this configuration the local bus connected channel may have considerably higher performance than the EISA/ISA bus channel. (This depends greatly on the type of interface component and IDE device.) A high speed disk drive (one that supports Advanced PIO Mode 3) may be connected to the faster channel while a CD-ROM drive is connected to the slower channel. Because of the slow transfer rates of the CD-ROM drive, the high speed disk drive may be significantly limited in performance if both were connected to the same channel.

The relative performance of a device is dependent upon the transfer modes supported by the device and the Host interface component. For example if a drive supports the fast Type F DMA but only supports Mode 1 PIO, then this device would perform significantly faster on a ISA based interface supporting Type F DMA over a PCI based interface. Likewise if that same drive supported Mode 3 PIO then it would perform better on the PCI based interface.

Auto-Detection: The BIOS performs full auto-detection of devices attached to any of the supported IDE channels. For a device to be detected it must support the Identify Drive command described in the ATA-2 Specification. Because devices are auto-detected, the BIOS may only report a warning when a devices is removed.

Since some devices violate the reset protocol defined in the ATA specification options are available in setup to select the amount of time to wait before declaring a drive as not present. The time-out period can be selected as 0, 5, 15, or 31 seconds. Many drives can be detected with a time-out of 0 seconds (0 seconds implies only 1 retry before aborting the detection algorithm), but a default value of 5 seconds is recommended. Some may require a time-out of 31 seconds.

Auto-Initialization: The BIOS can perform auto-initialization of all devices detected on any of the IDE channels. If the IDE sub-system is setup for full auto-configuration then all parameters are configured for the optimum performance supported by the drive/interface combination.

User Definable Drive Parameters: The BIOS allows a drives auto-configured geometric parameters to be substituted with a set of user definable parameters. These parameters will be used regardless of what data addressing mode is selected. When user definable drive parameters are selected, these parameters are used instead of the parameters reported by the device in the Identify Drive command.

Configuration of a user definable drive type does not determine a drives presence. If user definable parameters have been selected for a particular drive and that drive is not detected during the auto-detection of IDE devices, a configuration error will not be issued. User definable drive parameters are useful when a drive that has been formatted on another system using parameters other than that drives auto-configured parameters need to be added into the IDE subsystem. Selection of user definable drive parameters will not override other parameters configured by the BIOS and the particular drive must support the Identify Drive command to be recognized by the BIOS.

User Configurable Options

Multiple Sector Mode Transfers: This option allows the configuration of Multiple Sector Transfers. When this mode is enabled the BIOS will transfer a block of sectors between each interrupt from the drive instead of a single sector. The number of sectors transferred for each block is dependent upon the setting of this option and what is actually supported by the drive. Options that can be selected are Disabled, 4 Sectors/Block, 8 Sectors/Block and Auto-Configured.

The enabling of this feature will enhance the performance of a given drive. When this feature is enabled, a larger Sector/Block count will not necessarily translate into better performance. The optimum Sector/Block size is dependent upon the algorithm used in the IDE devices buffer management firmware.

When this feature is enabled, the BIOS will use the lowest Sector/Block size specified by either this setting or that reported by the drive. This insures that the BIOS will never use a Sector/Block size that is not supported by a particular device.

DMA Transfers: This option allows the configuration of DMA Transfers. When this mode is enabled, the BIOS will use DMA for data transfers instead of the Programmed I/O modes. The enabling of this feature will enhance the performance of a drive that supports DMA type data transfers. When the Auto-Configured option is selected, the BIOS will set up the drive for the fastest DMA transfer mode supported by the host interface component. If a device does not support DMA transfers, then the BIOS will not select this transfer mode.

Translation Mode: This feature determines the data access translation mode. The options are Standard CHS, Extended CHS, Logical Block Addressing, and Auto-Configured. When set to Auto-Configured, the LBA mode will always be used if supported by the connected device. If LBA is not supported, the ECHS is chosen only if required for access to the devices full capacity. When a non-auto configured option is selected, then that particular translation mode is used. If LBA is selected but not supported by the attached device, then standard CHS mode is used.

Enhanced IDE Support: This feature allows all of the Enhanced PIO modes to be disabled. When set to disabled, only the default Mode 0 PIO is allowed. This option does not effect the Multiple Sector mode setting or the DMA setting.

Data Structure Usage

Figure 2:
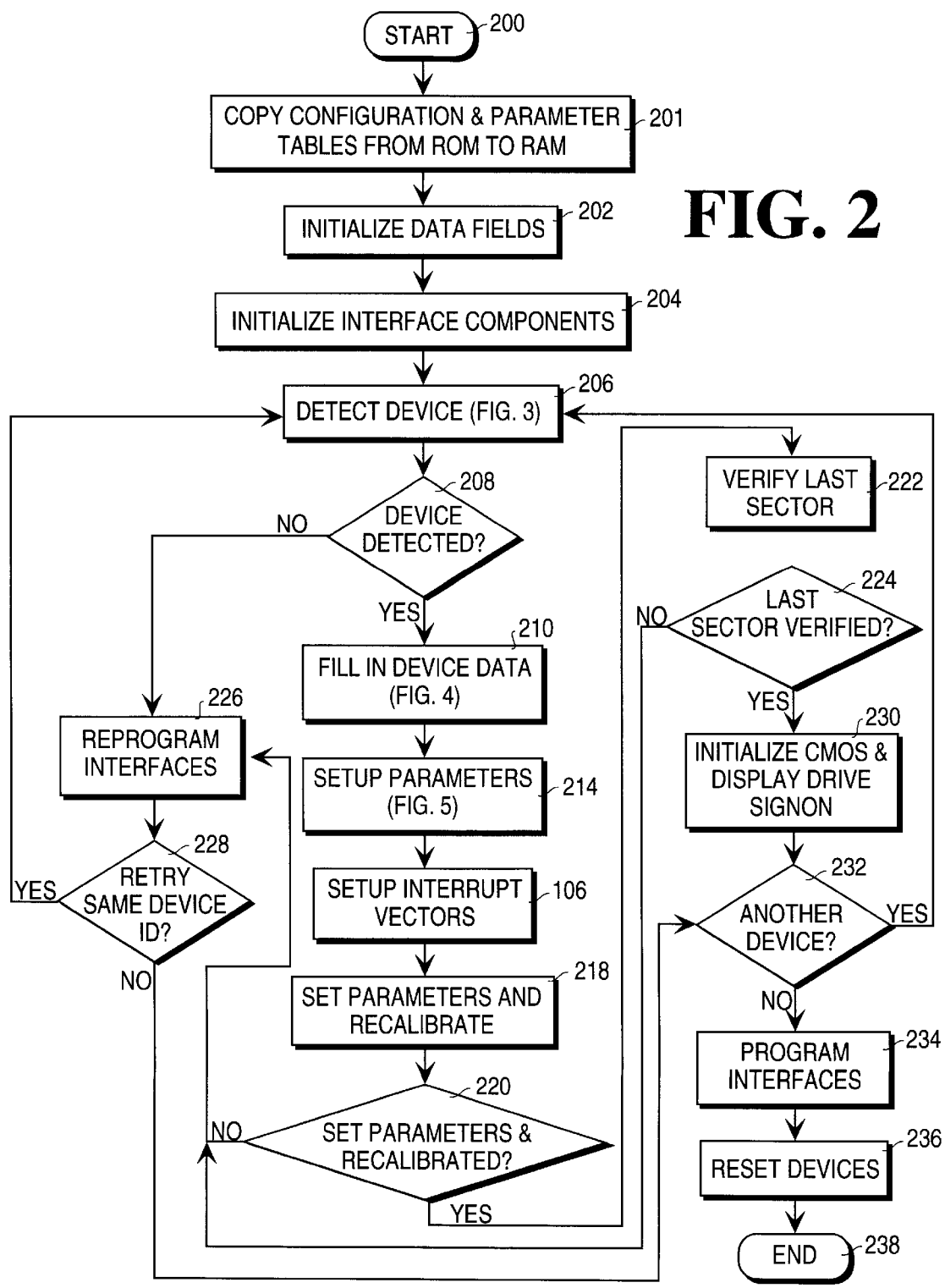
FIG. 2 is a flow chart of a program for detection and configuration of I/O devices program.

Configuration Table: A configuration table, (30) shown in FIG. 1, is used to store information determined about an IDE device. Each entry in the table corresponds to one logical devices. Each entry contains the following information:

Physical Device ID
Task File Base Address
Multiple Sector Transfer Size
Supported DMA Modes
LBA Support Flag
32-Bit I/O Support Flag
Minimum Cycle Time using IORDY
Minimum Cycle Time without using IORDY
Corresponding IRQ Description of Flow Charts Refer to FIG. 2 which is a flow chart of a detection and configuration of IDE devices program. The program starts (200), copies configuration and parameter tables from ROM to RAM (201), and initializes data fields (202). Initializing the data fields involves clearing any unwanted data that may be remaining from a previous boot. The program then initializes the interface components (204). Initialization of the interface components may be as simple as doing nothing to as complex as programming the interface component to enable it so that potential IDE devices that may be connected can be detected and configured. Note that no intelligent decisions are attempted at this time, the interface components are simply enabled.

Figure 3:
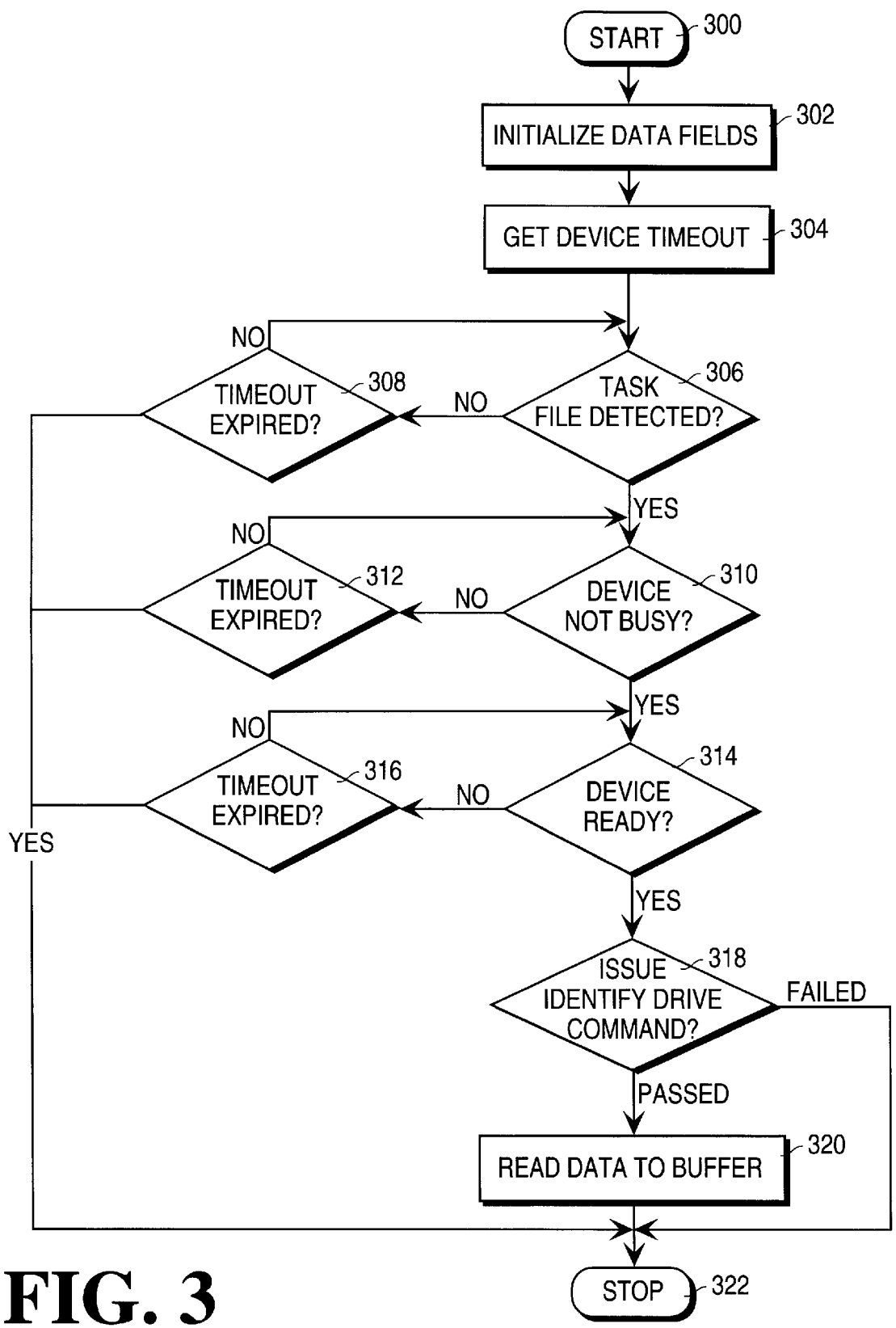
FIG. 3 is a flow chart of the detect device subroutine shown in FIG. 2.

The program executes a detect device subroutine (206), described in FIG. 3, that detects that a device is present at a specified device ID. If a device is detected, a YES from decision block (208), the program executes a fill in device data subroutine (210), described in FIG. 4.

If a device is not detected, a NO from decision block (208), the program reprograms interfaces (226) and decides if the program is to retry the same device ID (228). If YES, the flow returns to block (206). If NO, a check is made to determine if another device is to be tried (232). If YES, the flow returns to block (206).

Figure 5:
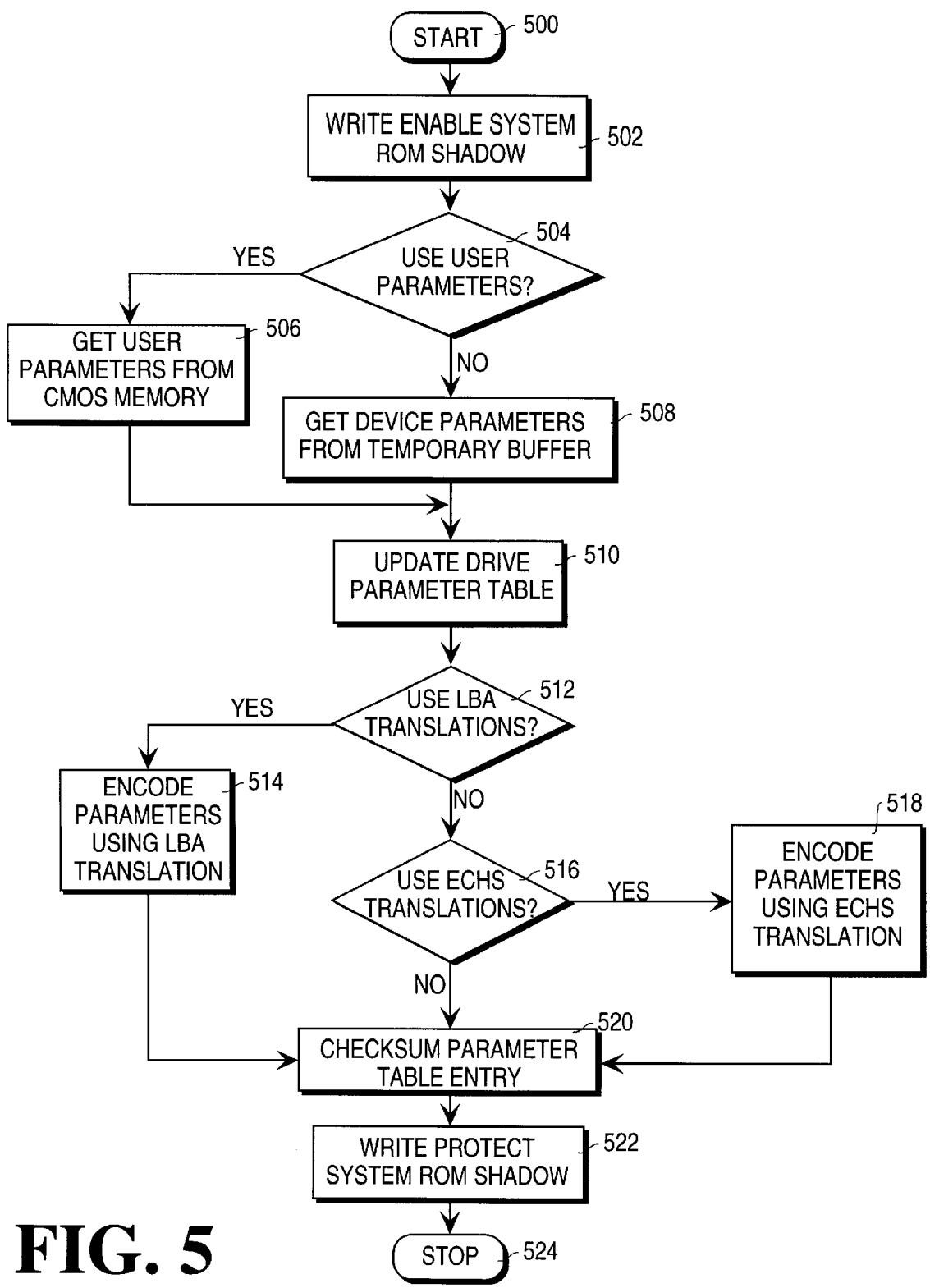

The program executes a Setup Parameters subroutine (214), described in FIG. 5. The flow proceeds to setup interrupt vectors (216) and sets parameters and re-calibrates (218). If the program cannot set parameters or re-calibrate, a NO from decision (220), the program reprograms interfaces (226) and decides if the program is to retry the same device ID (228).

If the program can set parameters and re-calibrate, a YES from decision (220), the program proceeds to verify the last sector (222). If the program cannot verify the last sector, a NO from decision (224), the program reprograms interfaces (226) and decides if the program is to retry the same device ID (228).

If the program can verify the last sector, a YES from decision (224), the program proceeds to Initialize CMOS and Display Drive Sign on (230).

If another device is to be tried, a YES from decision block (232), the program executes the detect device subroutine (206), described in FIG. 3, that detects that a device is active at the specified device ID.

If another device is not to be tried, a NO from decision block (232), the program executes program interfaces (234), resets the devices (236) and the program ends(238).

Refer to FIG. 3 which is a flow chart of the detect device subroutine shown in FIG. 2. The detect device subroutine starts (300) and first Initializes Data Fields (302). The program gets device time-out information (304). If a task file is not detected, a NO from decision (306), the flow checks the device time-out (308). If the time-out has expired, a YES from decision (308), the subroutine stops (322). If the time-out has not expired, a NO from decision (308), the flow returns to (306). If a task file is detected, a YES from decision (306), the flow proceeds check that the device is not busy (310).

If the device is found busy, a NO from decision (310), the flow proceeds check the device time-out (312). If the time-out has expired, a YES from decision (312), the subroutine stops (322). If the time-out has not expired, a NO from decision (312), the flow returns to (310). If the device is found not busy, a YES from decision (306), the flow proceeds check that the device is ready (314).

If the device is found not ready, a NO from decision (314), the flow proceeds check the device time-out (316). If the time-out has expired, a YES from decision (316), the subroutine stops (322). If the time-out has not expired, a NO from decision (316), the flow returns to (314). If the device is found ready, a YES from decision (314), the flow proceeds to issue the identify drive command (318).

If the device does not respond to the Identify Drive command, (the Failed path from decision (318)) the subroutine stops (322). If the device responds to the Identify Drive command, (the Passed path from decision (318)) the flow proceeds to read data from device into a data buffer (320) and when done the subroutine stops (322).

Figure 4:
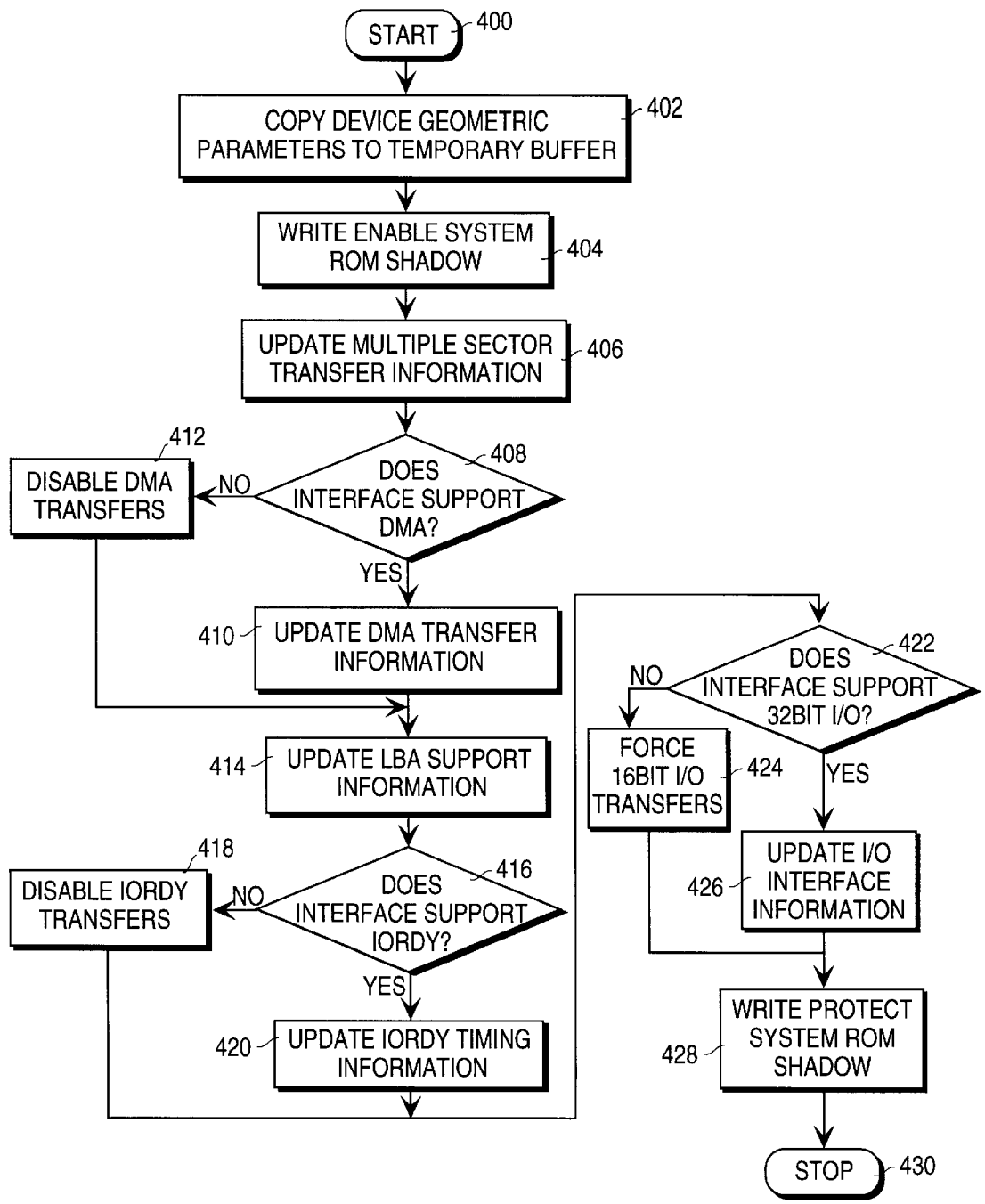
FIG. 4 is a flow chart of the fill in device data subroutine shown in FIG. 2; and, FIG. 5 is a flow chart of the setup parameters subroutine shown in FIG. 2.

Refer to FIG. 4 which is a flow chart of the fill in device data subroutine shown in FIG. 2. The fill in device data subroutine starts (400) and the program proceeds to copy the devices geometric parameters to temporary buffer (402).

The program proceeds to Write Enable System ROM Shadow (404). After write-enabling the ROM shadow, the configuration table can be modified. The configuration table provides the logical to physical mapping of devices so that the devices can be viewed as logically contiguous regardless of their actual physical order. In step 405, the configuration table is modified to indicate the detected device is coupled to the interface. The detected device is assigned a logical identifier sequential to that of any previously detected device. Processing continues with Update Multiple Sector Transfer information (406). Updating the Multiple Sector Transfer information is done by reading the Multiple Sector Transfer support field from the device data buffer and storing it in the configuration table entry being built in Shadow Memory.

The program checks to find if the interface supports direct memory access (DMA) operations (408). If YES the flow proceeds to update DMA transfer information (410). For DMA transfers the device controls the worst case timing instead of the host. Under this type of transfer, the host configures one of the DMA channels (Typically channel 7) to perform the transfer instead of the host CPU. Restrictions to this type of transfer are the buffer provided must be word aligned and the transfer must not cross a 64K boundary. An additional restriction by the BIOS for compatibility is that when executing in Protected or Virtual Mode and Virtual DMA Services are not provide by the Operating System, the BIOS will abort the DMA transfer and use the next fastest transfer mode available.

If NO out of block (408) the flow proceeds to disable DMA transfers (412).

The flow proceeds to update logical block addressing (LBA) support information (414). This is done be reading the device data buffer to see if LBA is supported and updating a data field in the configuration table entry stored in shadow memory if it is.

The program checks to find if the interface supports I/O Channel Ready (IORDY) operations (416). If YES the flow proceeds to update IORDY timing information (420). Advanced PIO timing is determined and configured.

If NO out of block (416) the flow proceeds to disable IORDY transfers (418). The flow proceeds to block (422).

The program checks to find if interface supports 32-bit I/O transfers (422). If YES the flow proceeds to update I/O interface information (426). When using one of the PIO timing modes the BIOS may elect to do 32 bit I/O if an interface component is detected that supports this type of I/O. 32 bit data transfers can provide as much as 20% improvement in performance over similar 16 bit data transfers.

After updating I/O interface information (426) the flow proceeds to write protect system shadow ROM (428) and the subroutine stops (430).

If NO out of block (422), the flow proceeds to force 16-bit I/O transfers (424). The flow proceeds to write protect system shadow ROM (428) and the subroutine stops (430).

Refer to FIG. 5 which is a flow chart of the setup parameters subroutine shown in FIG. 2. The program proceeds to Write Enable System ROM Shadow (502).

The program checks to find if the program is to use user parameters (504). If YES the flow proceeds to get user parameters from CMOS memory (506). If NO the flow proceeds to get device parameters from temporary buffer (508). The flow proceeds to block (510) where the program Updates the drive parameter table.

The program checks to find if the program is to use LBA translations (512). If YES the flow proceeds encode parameters using LBA translation (514). If NO the flow proceeds to block (516).

At block (516) the program checks to find if the program is to use Extended Cylinder-Head-Sector (ECHS) translations (516). If YES the flow proceeds encode parameters using ECHS translation (518). The ECHS translation mode is used for drives that have capacities larger than 528 Mb but do not support the Logical Block Addressing mode.

If NO out of block (516), the flow proceeds to block (520) Checksum Parameter Table Entry (520) and finally, the program write protects system ROM shadow (522) and the subroutine stops (524).

While the invention has been particularly shown and described with reference to preferred embodiments thereof, it will be understood by those skilled in the art that the foregoing and other changes in form and detail may be made therein without departing from the scope of the invention.

What is claimed is:

1. A method of configuring basic input/output system (BIOS) tables for accessing devices coupled to an interface, comprising:
   copying a device configuration table and a device parameter table into memory;
   testing for the existence of any device coupled to the interface using every physical device identifier supported by the size of the device configuration table;
   performing the following two steps for each detected device:
   modifying the configuration table to indicate that the detected device is coupled to the interface, wherein the detected device is assigned a logical identifier sequential to that of any previously detected device;
   modifying the device parameter table to indicate parameters associated with the detected device;
   translating a specified device identifier to a specified physical device identifier in response to an operating system request to access a selected device identified by the specified device identifier; and
   accessing the specified physical device in accordance with the configuration and device parameter tables.

2. The method of claim 1 wherein the interface is an integrated device electronics (IDE) interface.

3. The method of claim 1 wherein the testing includes:
   determining if a task file for a device having a selected physical device identifier is present;

determining if the device is busy;

determining if the device is ready;

issuing an identify drive command; and reading data from the device for modifying the configuration and device parameter tables.

4. The method of claim 3 further comprising stopping if a timeout period has expired at any point.

5. The method of claim 1 wherein the modifying the device parameter table further comprises:

determining supporting information including whether the device supports at least one of a multiple sector transfer, a direct memory access transfer, a logical block addressing, an input/output channel ready (IORDY) operation, and a 32-bit input/output; and modifying at least one of the configuration and device parameter tables in accordance with the supporting information.

6. The method of claim 1 wherein the modifying the device parameter table further comprises modifying the device parameter table with user-supplied values to indicate that the user-supplied parameters are to be used when accessing the device.

7. The method of claim 6 wherein the user-supplied parameters indicate whether the device is to use direct memory access transfers.

8. The method of claim 6 wherein the user-supplied parameters indicate the data access translation mode from at least one of a cylinder/head/sector (CHS) mode, an extended cylinder/head/sector (ECHS) mode, and a logical block addressing (LBA) mode.

9. The method of claim 6 wherein the user-supplied parameters indicate whether the device is to transfer multiple sectors at a time.

10. The method of claim 1, wherein the method is performed during a power-on system test (POST).

11. A machine readable storage medium having stored thereon machine executable instructions, the execution of said machine executable instructions to implement a method comprising:

copying a device configuration table and a device parameter table into memory;

testing for the existence of any device coupled to the interface using every physical device identifier supported by the size of the device configuration table;

performing the following two steps for each detected device:

modifying the configuration table to indicate that the detected device is coupled to the interface, wherein the detected device is assigned a logical identifier sequential to that of any previously detected device;

modifying the device parameter table to indicate parameters associated with the detected device;

translating a specified device identifier to a specified physical device identifier in response to an operating system request to access a selected device identified by the specified device identifier; and accessing the specified physical device in accordance with the configuration and device parameter tables.

12. The machine readable storage medium of claim 11 wherein the testing includes:

determining if a task file for a device having a selected physical device identifier is present;

determining if the device is busy;

determining if the device is ready;

issuing an identify drive command; and reading data from the device for modifying the configuration and device parameter tables.

13. The machine readable storage medium of claim 12 wherein the method further comprises stopping if a timeout period has expired at any point.

14. The machine readable storage medium of claim 11 wherein the modifying the device parameter table further comprises:

determining supporting information including whether the device supports at least one of a multiple sector transfer, a direct memory access transfer, a logical block addressing, an input/output channel ready (IORDY) operation, and a 32-bit input/output; and modifying at least one of the configuration and device parameter tables in accordance with the supporting information.

15. The machine readable storage medium of claim 11 wherein the modifying the device parameter table further comprises modifying the device parameter table with user-supplied values to indicate that the user-supplied parameters are to be used when accessing the device.

16. The machine readable storage medium of claim 11, wherein the method is performed during a power-on system test (POST).

17. An apparatus comprising:

circuitry to configure basic input/output system (BIOS) tables for accessing devices coupled to an interface, said circuitry to copy a device configuration table and a device parameter table into memory, test for the existence of any device coupled to the interface using every physical device identifier supported by the size of the device configuration table, and, for each detected device, modify the configuration table to indicate that the detected device is coupled to the interface, wherein the detected device is assigned a logical identifier sequential to that of any previously detected device, and modify the device parameter table to indicate parameters associated with the detected device;

said circuitry to translate a specified device identifier to a specified physical device identifier in response to an operating system request to access a selected device identified by the specified device identifier, and access the specified physical device in accordance with the configuration and device parameter tables.

18. The apparatus of claim 17 wherein, to test for the existence of any device, the circuitry is to determine if a task file for a device having a selected physical device identifier is present, determine if the device is busy, determine if the device is ready, issue an identify drive command, and read data from the device to modify the configuration and device parameter tables.

19. The apparatus of claim 18 wherein the circuitry is further to stop if a timeout period has expired at any point.

20. The apparatus of claim 17 wherein, to modify the device parameter table, the circuitry is to determine supporting information including whether the device supports at least one of a multiple sector transfer, a direct memory access transfer, a logical block addressing, an input/output channel ready (IORDY) operation, and a 32-bit input/output, and modify at least one of the configuration and device parameter tables in accordance with the supporting information.

21. The apparatus of claim 17 wherein, to modify the device parameter table, the circuitry is to modify the device parameter table with user-supplied values to indicate that the user-supplied parameters are to be used when accessing the device.

22. The apparatus of claim 17, wherein the circuitry operates during a power-on system test (POST).

* * * * *